(12) United States Patent
Kamepalli

(10) Patent No.: US 6,647,434 B1
(45) Date of Patent: Nov. 11, 2003

(54) MULTIFUNCTION DEVICE WITH REGISTER SPACE FOR INDIVIDUALLY ENABLING OR DISABLING A FUNCTION OF PLURALITY OF FUNCTIONS IN RESPONSE TO FUNCTION CONFIGURATION

(75) Inventor: Srinivas R. Kamepalli, Austin, TX (US)

(73) Assignee: Dell USA, L.P., Round Rock, TX (US)

(*) Notice: Subject to any disclaimer, the term of this patent is extended or adjusted under 35 U.S.C. 154(b) by 0 days.

(21) Appl. No.: 09/473,284

(22) Filed: Dec. 28, 1999

(51) Int. Cl.$^7$ .............................. G06F 13/00; G06F 3/00
(52) U.S. Cl. ................ 710/14; 710/8; 710/10; 710/104; 713/1; 713/2; 713/100; 713/324
(58) Field of Search .................. 710/8, 10, 14, 710/104; 713/1, 2, 100, 324

(56) References Cited

U.S. PATENT DOCUMENTS

| | | | |
|---|---|---|---|
| 5,220,312 A | 6/1993 | Lumelsky et al. | 345/563 |
| 5,241,643 A | 8/1993 | Durkin et al. | 711/115 |
| 5,621,902 A | 4/1997 | Cases et al. | 710/308 |
| 5,692,219 A | 11/1997 | Chan et al. | 710/49 |
| 5,725,559 A * | 3/1998 | Alt et al. | 607/5 |
| 5,768,619 A | 6/1998 | Roberts | 710/10 |
| 5,790,810 A * | 8/1998 | Kaba | 710/104 |
| 5,956,505 A * | 9/1999 | Manduley | 705/410 X |
| 5,978,860 A | 11/1999 | Chan et al. | 710/8 |
| 6,023,736 A * | 2/2000 | Lambeth et al. | 710/10 |
| 6,088,802 A * | 7/2000 | Bialick et al. | 713/200 |

OTHER PUBLICATIONS

Terry L. Matula and John R. Stuewe; "*Prevention Of Power State Change In Response To Chassis Intrusion!*"; Filed May 28, 1999; U.S. Ser. No.: 09/322,296; 26 Pages of Specification; and 4 Sheets of Drawings. (Copy Not Enclosed).

Stuart W. Hayes and Erik A. Schuchmann; "*Filter Circuit For Computer System Bus*"; Filed Oct. 16, 1998; U.S. Ser. No.: 09/174,275; 32 Pages of Specification; and 3 Sheets of Drawing. (Copy Not Enclosed).

"*PCI Local Bus Specification: Revision 2.2*"; Dec. 18, 1998; Chapter 6; pp. 189–220.

\* cited by examiner

Primary Examiner—Jeffrey Gaffin
Assistant Examiner—Tammara Peyton
(74) Attorney, Agent, or Firm—Haynes and Boone, LLP

(57) ABSTRACT

A system for individually disabling a function of a multifunction device located on a computer bus of a computer system. In one example, the multifunction device is located on a computer bus conforming to a PCI local bus standard and the multifunction device is a PCI compliant device. The multifunction device includes at least one register that stores configuration information regarding which functions are disabled. In response to a bus command addressed to a function, the configuration information is read to determine whether the function is disabled. The configuration information may be stored in the device dependent region of a configuration register space associated with each function. A function can be enabled or disabled by changing the configuration information stored in the multifunction device. Writes to change the configuration information may be made during a computer system BIOS startup routine or may be made by utilizing a configuration utility of the computer system's operating system. In some systems, the configuration information stored in a register space of each function includes information regarding the enablement or disablement of the other functions of the multifunction device.

32 Claims, 4 Drawing Sheets

MULTIFUNCTION DEVICE WITH REGISTER SPACE FOR INDIVIDUALLY ENABLING OR DISABLING A FUNCTION OF PLURALITY OF FUNCTIONS IN RESPONSE TO FUNCTION CONFIGURATION

BACKGROUND

This disclosure in general relates to computer systems and in particular to the disablement of a function of a multifunction device in a computer system.

Computer systems are information handling electronic systems which can be designed to give independent computing power to one user or a plurality of users. Computer systems may be found in many forms including, for example, mainframes, minicomputers, workstations, servers, personal computers, internet terminals, notebooks, and embedded systems. Computer systems include desk top, floor standing, rack mounted, or portable versions. A typical computer system includes at least one system processor, associated memory and control logic, and peripheral devices that provide input and output for the system. Such peripheral devices may include display monitors, keyboards, mouse-type input devices, floppy and hard disk drives, CD-ROM drives, printers, network capability card circuits, terminal devices, modems, televisions, sound devices, voice recognition devices, electronic pen devices, and mass storage devices such as tape drives, CD-R drives, or DVDs.

Typically, the system processor is operably coupled to a number of peripheral devices via a computer bus or busses. One computer bus standard is a Peripheral Component Interconnect (PCI) Local Bus standard such as, e.g., set forth in the PCI, Rev. 2.2 Specification, Dec. 18, 1998, © 1998 PCI Special Interest Group. Other types of computer bus standards include the Industry Standard Architecture (ISA), Enhanced ISA (EISA), Micro Channel, Personal Computer Memory Card Industry Association (PCMCIA), Universal Serial Bus (USB), and Small Computer System Interface (SCSI).

Multiple devices may be implemented in a multifunction device that is located on a computer bus. For example, a multifunction device may include computer bus controllers (e.g., SCSI bus controllers), audio controllers, and network interface controllers (e.g., ethernet controllers). One example of a multifunction device is the AIC-7899 sold by ADAPTEC. In some instances, a user may desire to disable a function of a multifunction device. For example, a user may wish to upgrade a device that is implemented in a multifunction device with a device that is mounted on an add-in card.

Devices located on a bus conforming to a PCI bus standard can be disabled by placing the IDSEL input of the device in an inactive state or by placing the PCIRST# signal in an active state using logic circuitry located on the motherboard. An example of a system is set forth in Chan et al., U.S. Pat. No. 5,692,219. However, such a system disables all of the functions of a multifunction device. What is desired is a system for individually disabling a function of a multifunction device.

SUMMARY

Providing a system with the ability to individually disable a function of a multifunction device advantageously allows for a function to be disabled without disabling the other functions of the multifunction device.

In one aspect of the disclosure, a computer system includes at least one system processor and a computer bus. The at least one system processor is operably coupled to the computer bus. The computer system also includes a multifunction device operably coupled to the computer bus. The multifunction device includes a plurality of functions. The computer system further includes means for individually disabling a function of the plurality of functions of the multifunction device.

In another aspect, a computer system includes at least one system processor and a computer bus. The at least one system processor is operably coupled to the computer bus. The computer system also includes a multifunction device operably coupled to the computer bus. The multifunction device includes a plurality of functions and register space. The computer system further includes a memory for storing code whose execution writes an indication to a location in the register space to disable a function of the plurality of functions.

In another aspect, disclosure includes a method for disabling a function of a multifunction device operably coupled to a computer bus. The method includes writing to a location in a register space of the multifunction device an indication to disable a function. The method also includes generating a bus command on the computer bus addressed to the function. The method further includes reading the indication in the location in the register space wherein the function is not responsive to the generated command in response to the reading that the function is disabled.

In another aspect, a computer system includes at least one system processor and a computer bus. The at least one system processor is operably coupled to the computer bus. The computer system also includes a multifunction device located on the computer bus. The multifunction device includes a plurality of functions and register space. The multifunction device also includes a first circuit. In response to a bus command addressed to a function of the multifunction device, the first circuit reads a location in the register space of the multifunction device to determine whether the function is to be responsive to the bus command.

BRIEF DESCRIPTION OF THE DRAWINGS

The present disclosure may be better understood, and its numerous objects, features, and advantages made apparent to those skilled in the art by referencing the accompanying drawings.

The use of the same reference symbols in different drawings indicates identical items unless otherwise noted.

DETAILED DESCRIPTION

The following sets forth a detailed description of a mode for carrying out the disclosure. The description is intended to be illustrative and should not be taken to be limiting.

Figure 1:
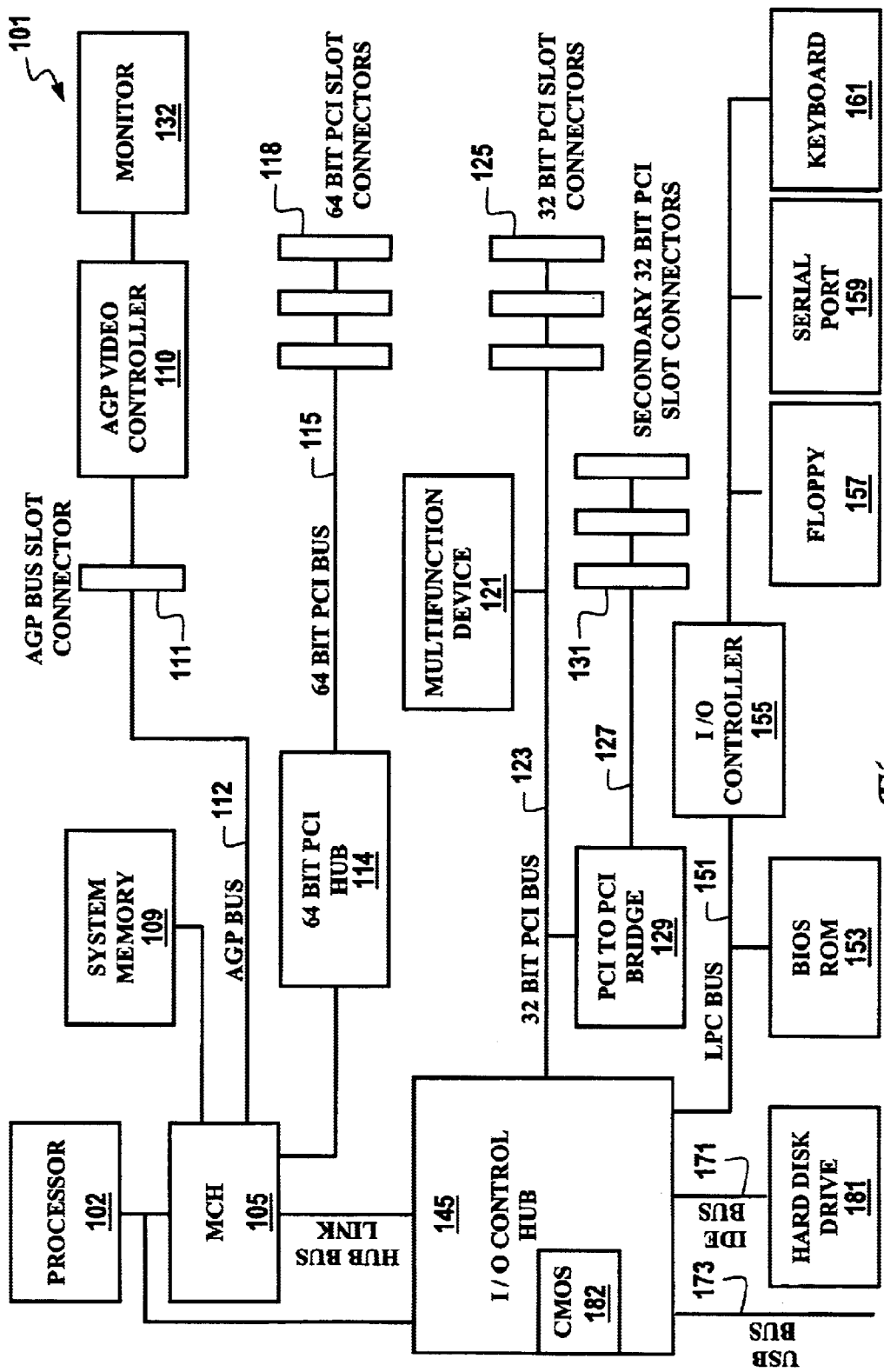
FIG. 1 is a block diagram of an example of a computer system.

FIG. 1 is a block diagram of an example of a computer system. Computer system 101 includes a system processor 102 such as, e.g., a PENTIUM III processor sold by INTEL™. System memory 109 is operably coupled to system processor 102 via a memory controller hub (MCH) 105, which in one embodiment is implemented with an 840 chipset sold by INTEL™.

Computer system 101 includes a number of computer busses conforming to various computer bus standards that enable system processor 102 to be operably coupled to multiple computer devices. Computer bus 115 is a 64 bit computer bus conforming to a Peripheral Component Interface (PCI) Local Bus Specification, such as, e.g., the PCI Local Bus Specification, Rev. 2.2. 64 bit PCI card slot connectors 118 are located on computer bus 115 and are operably coupled to memory controller hub 105 via a 64 bit PCI hub 114. Computer bus 123 is a 32 bit computer bus conforming to a PCI specification. Located on PCI computer bus 123 are PCI card slot connectors 125. Computer bus 123 is operably coupled to system processor 102 via I/O controller hub 145. In one example, I/O controller hub 145 is implemented with a ICH chip sold by INTEL™. Computer system 101 also includes a secondary 32 bit PCI computer bus 127 operably coupled to computer bus 123 via a PCI-to-PCI bridge 129 with 32 bit PCI card slots 131 located on secondary bus 127. A number of computer PCI compliant devices may be operably coupled to PCI busses 115, 123, and 127 including devices (not shown) located on computer cards inserted into card slot connectors 118, 125, and 131. Such devices include e.g., remote access circuits such as LAN connector circuits and modem circuits and sound card circuits.

Computer system 101 includes a PCI compliant multifunction device 121 located on PCI bus 123. Multifunction device 121 includes multiple devices (functions) that are operably coupled to system processor 102 via PCI bus 123. As will be explained later, each function of multifunction device 121 can be individually disabled. Multifunction device 121 is mounted on a system board (not shown). Other PCI compliant multifunction devices (not shown) may also be located on PCI busses 127 and 115. Also, PCI compliant multifunction devices may be mounted on add-in cards inserted into the PCI slot connectors 118, 125, or 131.

Figure 2:
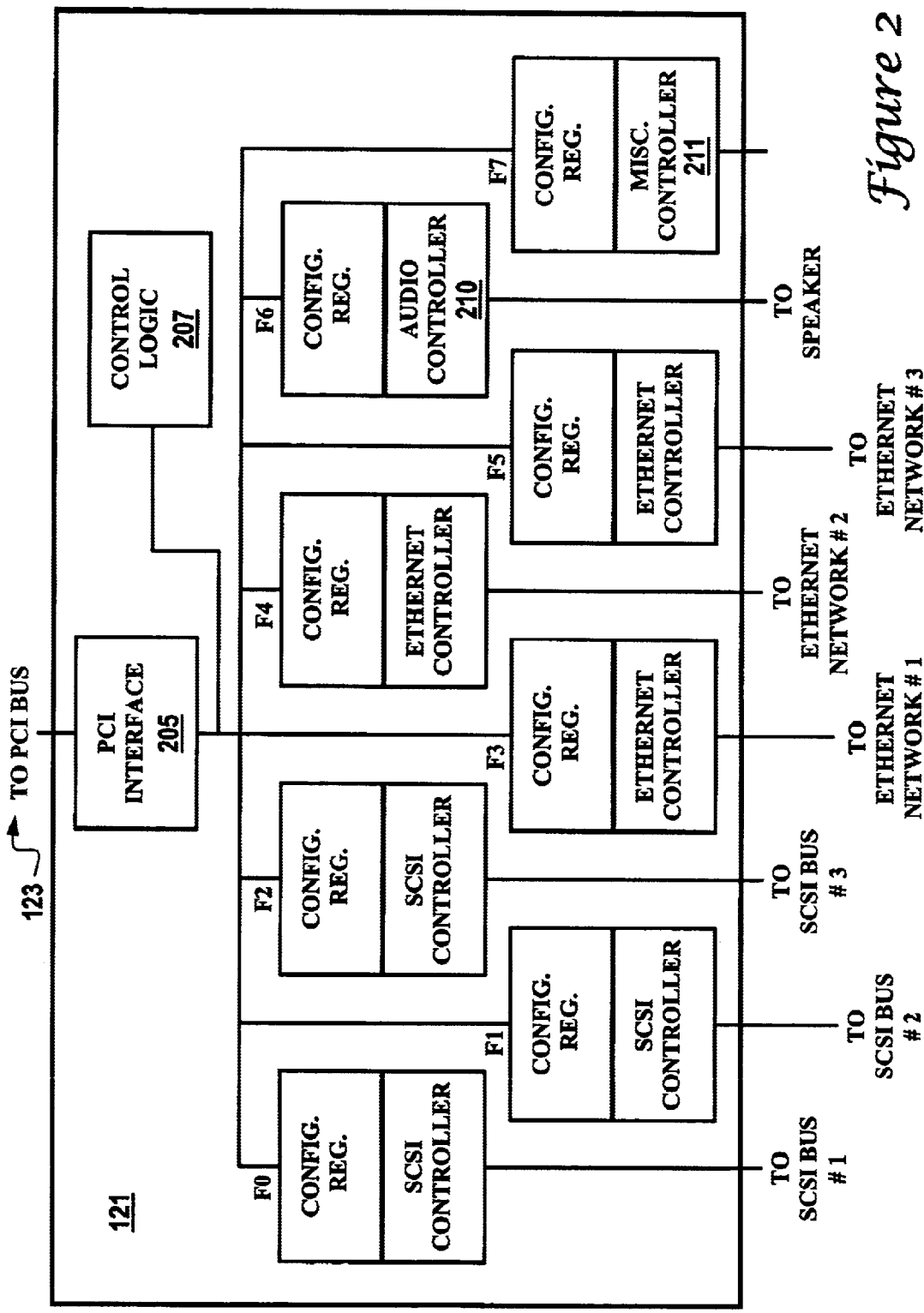
FIG. 2 is a block diagram of an example of a multifunction device.

FIG. 2 shows a block diagram of multifunction device 121. Multifunction device 121 includes a PCI interface 205 which allows multifunction device 121 to operate on a PCI bus. Multifunction device 121 includes 8 functions designated F0–F7 in FIG. 2. Each function has an associated configuration register space and a controller for performing the operations of the function. Multifunction device 121 includes three SCSI bus controllers#1–3 operably coupled SCSI busses #1–3 respectively. Multifunction device 121 also includes three ethernet controllers #1–3 operably coupled to three ethernet networks #1–3, respectively. Multifunction device also includes an audio controller 210 operably coupled to a speaker and a miscellaneous controller 211.

Figure 3:
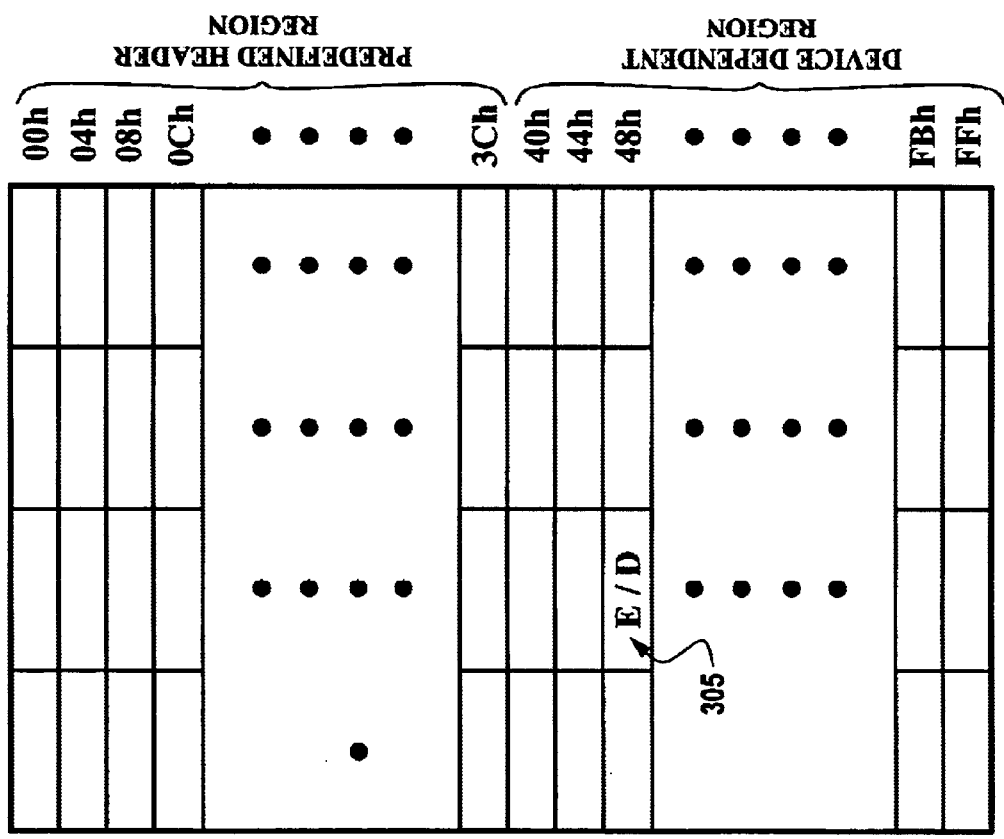
FIG. 3 is a register map of an example of a configuration register space allocation.

FIG. 3 is an example of a configuration register space map for the configuration register spaces of multifunction device 121. Each configuration register space associated with each function of multifunction device 121 includes 256 byte registers which are shown in FIG. 3 in rows of four having a hexadecimal numbering from 00h to FFh. Each configuration register space includes a predefined header region of byte registers 00h to 3Ch and a device dependent region of byte registers 40h to FFh. The predefined header region include fields that uniquely identify the function and allow the function to be generically controlled. The fields of the predefined header region are defined in the PCI specification.

The device dependent region of each configuration register space includes a enable/disable byte register 305 which in FIG. 3 is located at byte register 4Ah, but with other computer systems may be located at other addresses in the configuration register space. In one embodiment, in response to each PCI bus command addressed to a particular function of the multifunction device 121, PCI interface 205 reads the contents of the enable/disable register (e.g., 305) of that particular function. If the contents of the enable/disable register associated with the particular function indicate that the function is not disabled, the PCI interface 205 responds to the command according to the protocol set forth in the PCI specification. If the contents of the disabled/enabled register of the particular function indicates that the function is disabled, then the PCI interface 205 does not respond to the command. Thus, the disabled function is not responsive to the bus command. If no device on the PCI bus responds to the bus command, then the command is aborted as per protocol set forth in the PCI specification.

Figure 4:
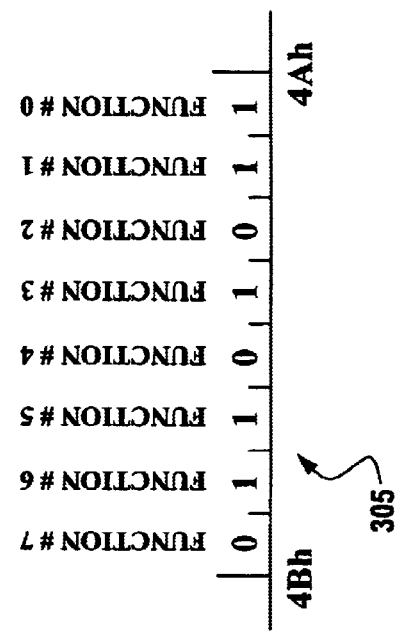
FIG. 4 shows an example of a configuration indication in an enable/disable register.

FIG. 4 shows an example of contents of an enable/disable register according to the present invention. In the embodiment shown, the enable/disable register 305 of each configuration register space stores an indication of disablement for all of the functions of multifunction device 121. Register byte 305 includes an 8 bit configuration indication where each bit represents whether a particular function of the multifunction device is disabled. If the bit that represents a function is a "1", then that function is not disabled. If the bit representing a function is a "0", then that function is disabled. For example, according to the contents of register 4Ah in FIG. 4, Functions #2, #4, and #7 are disabled and functions #0, #1, #3, #5, and #6 are not disabled.

Storing an indication of disablement for all of the functions in the configuration register space of each function advantageously allows a computer system to enable a disabled function without booting up. For example, to enable a disabled function, the configuration indication can be written to an enable/disable register of an enabled function wherein the control logic 207 writes the configuration information to the enable/disable register of the disabled function. Another advantage of storing an indication of disablement in the configuration register space of each function is that it allows a BIOS routine or other routine to be able to determine what the disablement status is of each function by performing only one configuration read bus command to an enabled function.

In other embodiments, the enable/disable configurations register of a function would only store an indication of whether that particular function is enabled or disabled. With some of these embodiments, only one bit of configuration register space (or other register space) would be required for storing the configuration information for that function.

If the disabled/enabled register of FIG. 4 were located in the configuration register space of Function #4, then PCI interface 205 would not respond to PCI bus commands addressed to Function #4 in that the bit for Function #4 is a "0". If, on the other hand, the disabled/enabled register of FIG. 4 were located in the configuration register space of Function #1, then PCI interface 205 would respond to PCI bus commands addressed to Function #1 in that the bit for Function #1 is a "1".

For the embodiment shown, to disable a function of the multifunction device, the enable/disable register associated with the function to be disabled is written with a value that has a "0" in the bit place for the function to be disabled.

In one embodiment, the configuration indications are written to the enable/disable registers during a BIOS routine during the startup of computer system 101. The BIOS routine is implemented by system processor 102 executing BIOS code initially stored in BIOS ROM 153. However, during startup, the BIOS code may be shadowed into system memory 109.

Figure 5:
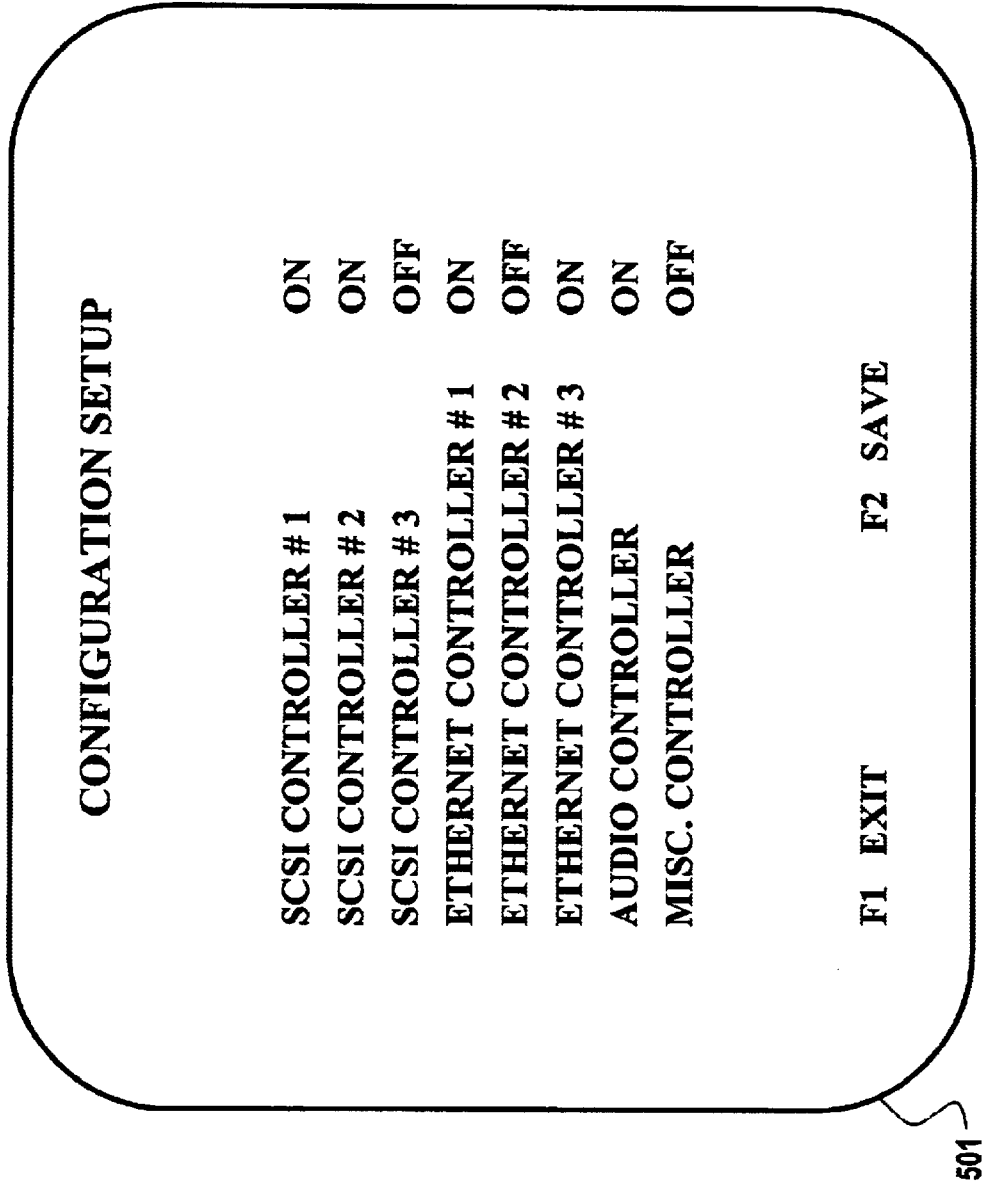
FIG. 5 is a view of an example of a monitor screen presented during a configuration setup.

FIG. 5 is a example of a screen displayed on monitor 132 during a system setup BIOS routine (e.g., during a Power On System Test (POST) routine) of computer system 101. During the startup of computer system 101, a user may select an option of going into system setup by e.g., pressing a function key (not shown) on keyboard 161.

In system setup, monitor 132 displays a list of devices (functions) implemented in multifunction device as shown in FIG. 5. An "ON" next to the function name indicates that the function is enabled. An "OFF" next to the function name indicates that the function is disabled. To disable a function, the user changes the adjacent "ON" designation to an "OFF" designation and then saves the configuration (e.g., by pressing the F2 key). The configuration is then stored in a non volatile memory location such as, e.g., CMOS memory 182 of I/O controller hub 145.

When the computer system is rebooted, system processor performs a BIOS routine that reads the configuration stored in non volatile CMOS memory 182. The BIOS routine then writes an 8 bit configuration indication of the saved configuration utilizing a PCI configuration write command to a enable/disable byte register of a configuration register space of one of the functions (F0–F7) of multifunction device 121. For the configuration shown in FIG. 5, the bit sequence "01101011" would be written into an enable/disable register of a function of multifunction device 121. Control logic 207 then writes the configuration indication to the other enable/disable registers of the other functions.

In some computer systems, the BIOS routine writes the 8 bit configuration indication to the same function every time during startup (e.g., Function #0) and in response, control logic 207 writes the configuration indication to the enable/disable registers of the other functions.

With other computer systems, the BIOS routine writes the configuration indication to the enable/disable register associated with a function of multifunction device 121 that is to be disabled. With other computer systems wherein the multifunction device does not include control logic 207, a BIOS routine performs eight configuration writes to all of the configuration register spaces of each function of multifunction device 121.

With some systems, the power up default value of the enable/disable register for each function is "11111111" such that all functions are initially enabled at startup. Thus, a configuration indication must be written to multifunction device 121 every time that computer system 101 is startup. However, other multifunction devices may include a non volatile memory that stores the configuration indication. Thus, the BIOS routine would write the configuration indication to the multifunction device only when the configuration has changed. With some multifunction devices that have less than eight functions, the bits in the enable/disable register that represent function numbers not implemented are hardwired to "0". Thus, these bits will always be read as "0" and can not be changed to "1".

To enable a function that has been disable, the user returns to the configuration set up screen (e.g., FIG. 5) and changes the "OFF" adjacent to the disabled function to an "ON." After saving the configuration and rebooting, a BIOS routine searches for an enabled function (from the saved configuration in CMOS 182) and generates a configuration write to the enable/disable register of the selected enabled function. The value written to the enable/disable register of the selected enabled function includes a "1" in the bit place of the disabled function to be enabled. In response to the write to the selected enabled function, control logic 207 writes the configuration indication written to the enable/disable register of the selected enabled function to the other enable/disable registers of the other functions, including the register of the function to be enabled.

The operating systems of some computer systems may include a configuration utility that allows a user to enable or disable a device. The configuration utility generates configuration setup screens and the configuration write bus commands to the multifunction device. With some computer systems, a user may disable or enable a function utilizing the configuration utility without having to reboot the computer system.

Referring back to FIG. 2, in another embodiments, the enable/disable register may be implemented in other register spaces located in multifunction device 121. For example, in one embodiment, an enable/disable register is located in a separate auxiliary register space (not shown in FIG. 2) of multifunction device 121 which includes at least one register and is operably coupled to PCI interface 205. In response to receiving a PCI bus command addressed to a particular function of the multifunction device, the PCI interface reads the enable/disable register in the auxiliary register space to determine if the particular function is disabled. In order to write to the enable/disable register of the auxiliary register space, control logic 207 would, in response to a configuration write bus command to a predetermined register in the device dependent region of any function of multifunction device 121, write the contents of the configuration write to the enable/disable register of the auxiliary register space. For example, if the predefined register of the configuration register space is 4Ah, then in response to a PCI configuration write of the value "11100100" to register 4Ah of the configuration register space for Function 5 (or any other function), control logic 207 would write the value "11100100" to the enable/disable register of the auxiliary register space.

In other embodiments, the enable/disable register that is addressable by a BIOS routine (or other routine) is located in a configuration register space of a function of the multifunction device that can not be disabled. In this embodiment, a BIOS routine (or other routine) generates all configuration writes to disable (or enable) the other functions to the enable/disable register of the function can not be disabled. Referring to FIG. 2, in one example, Function 7 of multifunction device 121 would be designated as the function that can not be disabled. To disable or enable any of the other functions (F0–F6), a BIOS routine or other configuration routine would perform a configuration write to a predetermined register in the configuration register space of Function 7. In one embodiment, in response to a configuration write to the enable/disable register of Function 7, control logic 207 would write the contents of the predetermined register to the enable/disable registers of the other functions.

Referring back to FIG. 1, Computer system 101 also includes computer bus 151 which conforms to the Low Pin Count (LPC) bus standard. LPC computer bus 151 is operably coupled to computer system 101 via I/O controller hub 145. Operably coupled to LPC computer bus 151 are BIOS ROM 153 and I/O controller 155. Operably coupled to the I/O controller 155 are floppy disk drive 157, serial port 159, and keyboard 111. Computer system 101 also includes a computer bus 171 conforming to the Integrated Drive Electronics (IDE) standard and computer bus 173 conforming to the Universal Serial Bus (USB) standard. A hard disk drive 181 is located on IDE bus 171. Hard disk drive 181 stores application and operating system code. A video controller 110 conforming to the Advanced Graphics Port Specification (AGP video controller) is mounted on a computer card (not shown) that is inserted into an AGP card slot connector 111 which is operably coupled to memory controller hub 105 via AGP bus 112. Other conventional computer devices (not shown) may be coupled via the computer busses and may be located either on computer cards or mounted to a system board of computer system 101. Those of skill in the art will recognize that, based upon the teachings herein, a system for individually disabling a function of a multifunction device may be implemented in computer systems of different forms and configurations.

Those of skill in the art will recognize that, based upon the teachings herein, several modifications may be made to the embodiments shown in FIGS. 1–5 and describe herein. For example, the described systems for individually disabling a function of a multifunction device may be implemented with multifunction devices located on other types of computer busses. Also, some systems, the functions of control logic 207 may be implemented in interface circuit 205.

While particular embodiments of the present disclosure have been shown and described, it will be recognized to those skilled in the art that, based upon the teachings herein, further changes and modifications may be made without departing from this disclosure and its broader aspects, and thus, the appended claims are to encompass within their scope all such changes and modifications as are within the true spirit and scope of this disclosure.

What is claimed is:

1. A computer system comprising:
   at least one system processor;
   a computer bus, the at least one system processor operably coupled to the computer bus;
   a multifunction device operably coupled to the computer bus, the multifunction device including a plurality of functions;
   means for individually enabling or disabling a function of the plurality of functions of the multifunction device in response to a function configuration; and
   a register space including a predefined header region and a device dependent region, the predefined header region including fields that uniquely identify the function and allow the function to be generically controlled, the device dependent region including an enable/disable byte register.

2. The computer system of claim 1 wherein:
   the means for individually disabling further includes means for writing an indication to a location in the register space to disable a function of the plurality of functions.

3. The computer system of claim 2 further wherein the multifunction device further includes a plurality of register spaces, each register space associated with a function of the plurality, wherein the means for writing writes the indication to a location in a register space associated with the function to be disabled.

4. The computer system of claim 2 wherein:
   the multifunction device further includes a plurality of register spaces, each register space associated with a function of the plurality; and
   the means for writing further includes a means implemented in the multifunction device for, in response to an indication being written to one of the plurality of register spaces, writing an indication to a location in each of the other register spaces of the plurality of register spaces.

5. The computer system of claim 1 wherein the means for individually disabling further includes means for receiving a user indication to disable a function of a multifunction device.

6. The computer system of claim 1 wherein the computer bus substantially conforms to a PCI Local Bus standard and the multifunction device is a PCI compliant device.

7. A computer system comprising:
   at least one system processor;
   a computer bus, the at least one system processor operably coupled to the computer bus;
   a multifunction device operably coupled to the computer bus, the multifunction device including a plurality of functions, the multifunction device including a register space including a predefined header region and a device dependent region, the predefined header region including fields that uniquely identify a function of the functions and allow the function to be generically controlled, the device dependent region including an enable/disable byte register; and
   a memory for storing code whose execution writes an indication to a location in the register space to enable or disable a function of the plurality of functions in response to a function configuration.

8. The computer system according to claim 7 wherein:
   the code is implemented in BIOS code.

9. The computer system of claim 7 wherein:
   the multifunction device further includes a plurality of register spaces, each register space associated with a function of the plurality; and
   execution of the code writes the indication to a register space associated with a first function of the plurality of functions.

10. The computer system of claim 9 wherein the first function is a function to be disabled.

11. The computer system of claim 9 wherein the multifunction device further includes a logic circuit which in response to a writing of the indication to the register associated with the first function, writes an indication to the other register spaces of the plurality of register spaces of the multifunction device.

12. The computer system of claim 7 wherein:
    the multifunction device includes a first circuit; and
    the multifunction device further includes a plurality of register spaces, each register space associated with a function of the plurality;
    wherein in response to receiving from the computer bus a bus command addressed to a function, the first circuit reads the location in the register space associated with that function to determine if the function is disabled.

13. The computer system of claim 7 wherein the computer bus substantially conforms to a PCI Local Bus standard and the multifunction device is a PCI compliant device.

14. The computer system of claim 13 wherein:
    the multifunction device further includes a plurality of configuration register spaces, each configuration register space associated with a function of the plurality;
    wherein execution of the code writes the indication to a configuration register space associated with a function of the plurality of functions.

15. The computer system of claim 14 wherein the location is in a device dependent region of a configuration register space.

16. The computer system of claim 7 wherein the indication includes a bit for each function of the plurality representing whether the function is disabled.

17. A method for disabling a function of a multifunction device operably coupled to a computer bus comprising:

writing to a location in a register space of the multifunction device an indication to enable or disable a function in response to a function configuration, the register space including a predefined header region and a device dependent region, the predefined header region including fields that uniquely identify the function and allow the function to be generically controlled, the device dependent region including an enable/disable byte register;

generating a bus command on the computer bus addressed to the function; and reading the indication in the location in the register space wherein the function is not responsive to the generated command in response to the reading that the function is disabled.

18. The method of claim 17 wherein each function of the multifunction device has an associated register space, wherein the location is in the register space associated with the first function.

19. The method of claim 17 wherein each function of the multifunction device has an associated register space and wherein the writing to a location in a register space further includes:

writing the indication to a register space associated with a first function of the plurality; and writing the indication to a location in each of the register spaces associated with each of the functions other than the first function in response to the writing the indication to the register spaced associated with the first function.

20. The method of claim 19 wherein the first function is the function to be disabled.

21. The method of claim 17 further comprising:

receiving an indication to disable a second function of the multifunction device;

wherein the writing to the location in the register space further includes writing to the location an indication that the function and the second function are to be disabled.

22. The method of claim 17 further comprising:

receiving an indication to enable a disabled function of the plurality of functions;

determining that a second function of the plurality is enabled; and writing to a register space associated with the second function an indication to enable the disabled function.

23. The method of claim 22 further comprising:

writing an indication that the disabled function is enabled to a register space associated with the disabled function in response to the writing to the register space associated with the second function an indication to enable the disabled function.

24. The method of claim 17 further wherein the indication further includes an indication of which functions of the plurality are disabled.

25. The method of claim 17 wherein the computer bus substantially conforms to a PCI Local Bus standard and the multifunction device is a PCI compliant device.

26. A computer system comprising:

at least one system processor;

a computer bus, the at least one system processor operably coupled to the computer bus;

a multifunction device located on the computer bus, the multifunction device including a plurality of functions, the multifunction device includes a register space, the multifunction device including a first circuit, wherein in response to a bus command addressed to a function of the multifunction device, the first circuit reads a location in the register space of the multifunction device to determine whether the function is configured as enabled or disabled and if enabled, then to be responsive to the bus command and if disabled, then to be non-responsive to the bus command; and the register space including a predefined header region and a device dependent region, the predefined header region including fields that uniquely identify the function and allow the function to be generically controlled, the device dependent region including an enable/disable byte register.

27. The computer system of claim 26 wherein:

the multifunction device further includes a plurality of register spaces, each register space associated with a function of the plurality;

wherein the first circuit reads a location in the register space associated with the function to which the bus command is addressed.

28. The computer system of claim 27 wherein the multifunction device further includes a logic circuit which in response to a writing of an indication to a register space that a function is to be disabled, writes an indication to the other register spaces of the plurality of register spaces that the function is disabled.

29. The computer system of claim 26 wherein the computer bus substantially conforms to a PCI Local Bus standard and the multifunction device is a PCI compliant device.

30. The computer system of claim 29 wherein the location is a location in a configuration register space associated with the function to which the bus command is addressed.

31. The computer system of claim 30 wherein the location is in a device dependent region of a configuration register space.

32. The computer system of claim 26 wherein the first circuit is implemented in a bus interface circuit.

* * * * *